(No Model.)  
3 Sheets—Sheet 3.
W. DUNBAR.
TRACK CLEARER.
No. 298,295.  
Patented May 6, 1884.
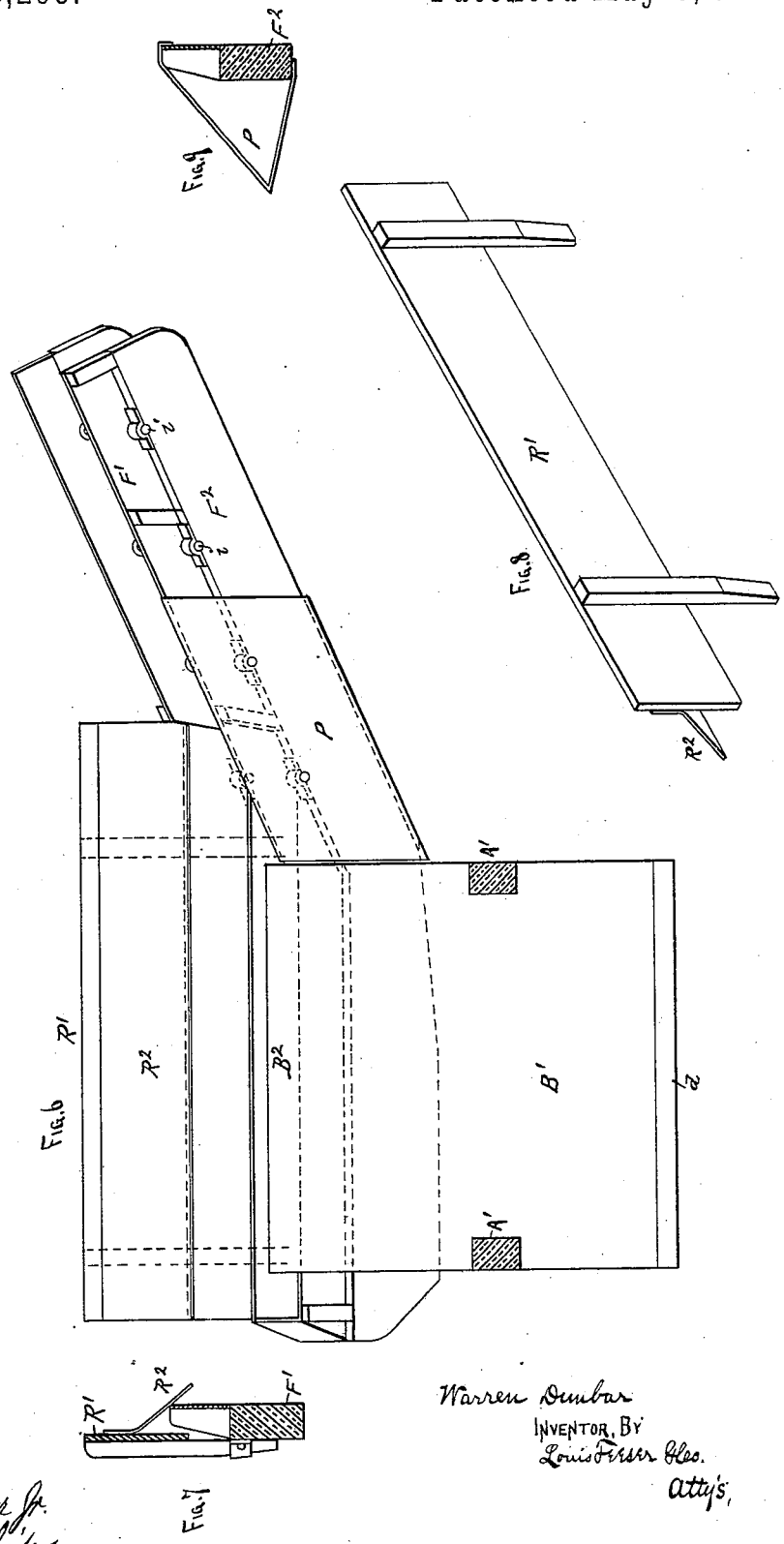

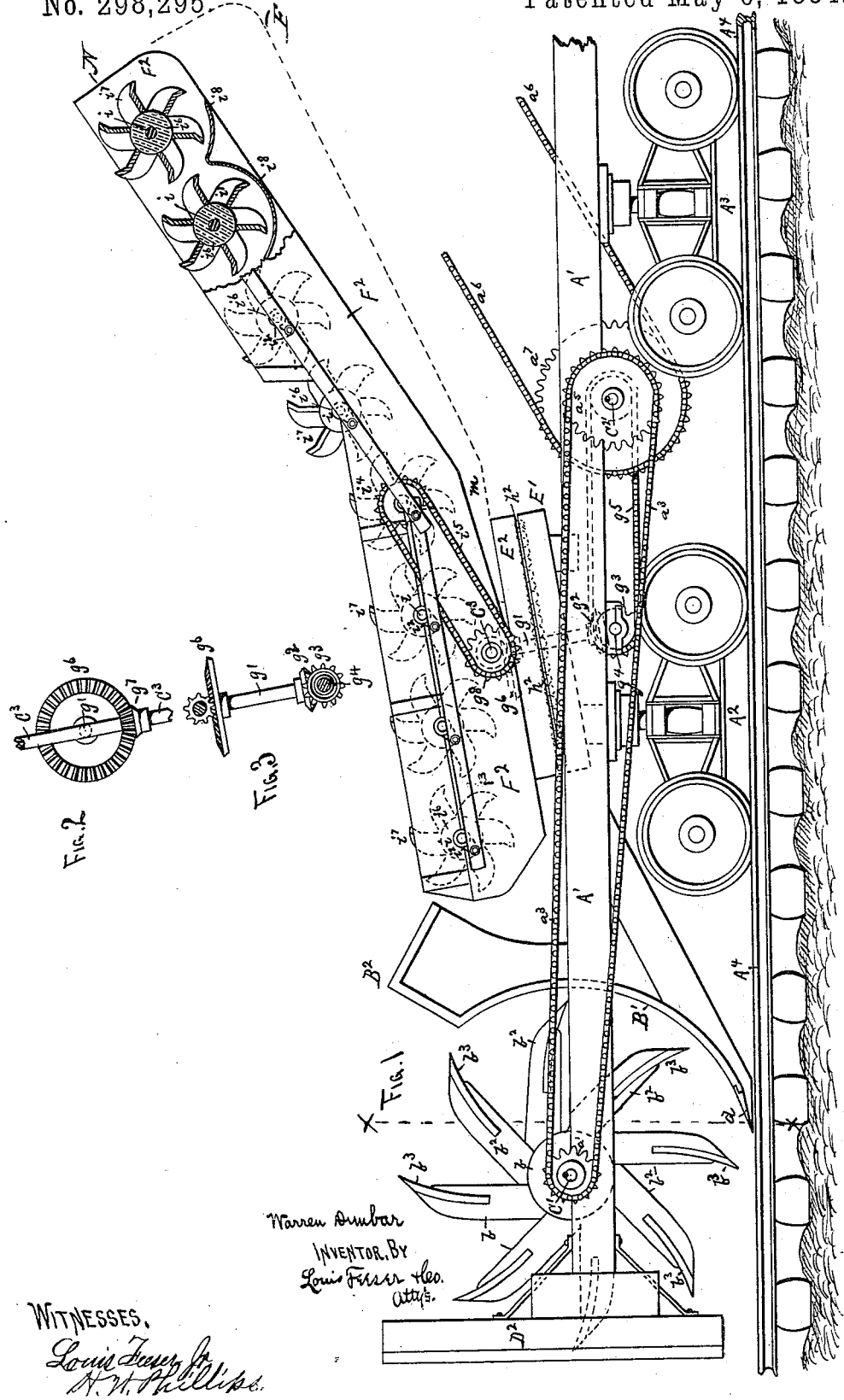

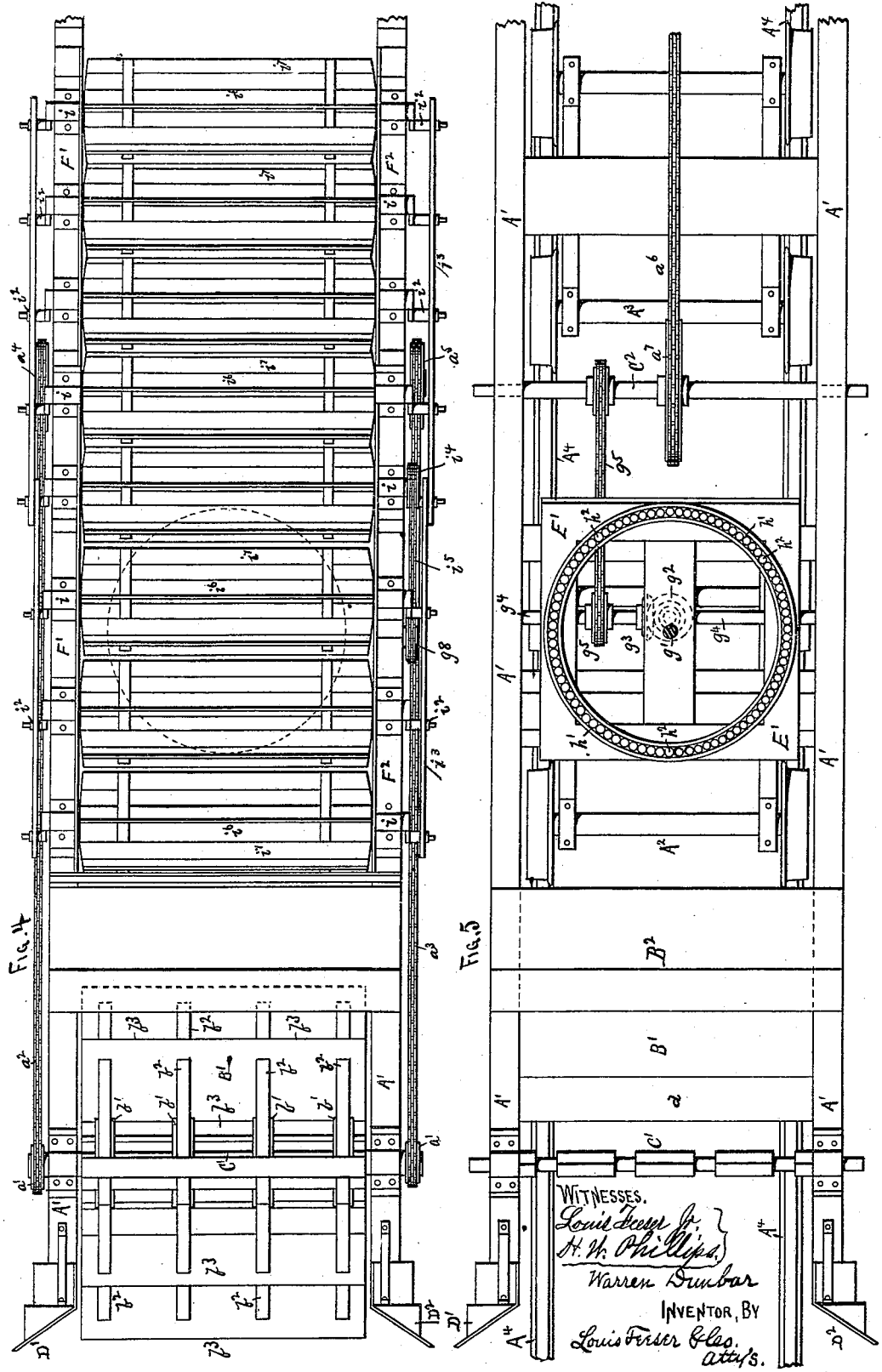

UNITED STATES PATENT OFFICE.

WARREN DUNBAR, OF MINNEAPOLIS, MINNESOTA.

TRACK-CLEARER.

SPECIFICATION forming part of Letters Patent No. 298,295, dated May 6, 1884.

Application filed July 28, 1882. (No model.)

*To all whom it may concern:*

Be it known that I, WARREN DUNBAR, a citizen of the United States, and a resident of Minneapolis, in the county of Hennepin, in the State of Minnesota, have invented certain new and useful Improvements in Railroad-Track Clearers, of which the following specification is a full, clear, and exact description, reference being also had to the accompanying drawings, in which—

Figure 1 is a side elevation; Figs. 2 and 3, detached details of a portion of the operating mechanism. Fig. 4 is a plan view. Fig. 5 is a plan view with the revolving cutting-wheel and swiveled conveyer-frame removed. Fig. 6 is a front view of the frame and plow in section on the line $x\,x$ (the front cutting-wheel removed) of Fig. 1, showing the swiveled conveyer-frame turned off at right angles to the plow-frame. Fig. 7 is a cross-sectional detail of the rear snow-guard of the conveyer-frame, and Fig. 8 is a perspective view of the same. Fig. 9 is a cross-sectional view of a portion of the conveyer-frame, showing the manner of attaching the front snow-guard to the conveyer-frame.

$A'$ is a horizontal frame, mounted upon ordinary railroad-car trucks, $A^2\,A^3$, which run upon tracks $A^4$, and the frame provided with a plow, $B'$, upon its forward end. The sides of the frame $A'$ project forward of the plow $B'$, and have a shaft, $C'$, journaled across them, as shown in Figs. 1, 4, and 5. Upon the outer ends of this shaft chain-pulleys $a'$ are secured and connected by chains $a^2\,a^3$ to larger chain-pulleys $a^4\,a^5$ upon a shaft, $C^2$, journaled across the frame $A'$, some distance in the rear of the plow $B'$. This shaft $C^2$ is adapted to be driven by a chain, $a^6$, acting upon a chain-pulley, $a^7$, upon the shaft $C^2$, the chain $a^6$ being connected to a stationary engine (not shown) upon the rear of the frame $A'$. By this means the shaft $C'$ will be revolved.

Secured upon the shaft $C'$, between the sides of the frame $A'$, are a series of hubs, $b'$, having radiating arms $b^2$, across which buckets or blades $b^3$ are secured, as shown, the whole forming a revolving cutting drum or wheel. The curve of the plow $B'$ will correspond with the diameter of this cutting-wheel, so that the outer edges of the buckets $b^3$ will run close to the surface of the plow, as shown in Fig. 1. The plow $B'$ will be armed at the lower front edge with a metal "nose" or "shoe," $d$, running close down to the track $A^4$, and the surface of the plow will be protected by a sheet-metal covering, and the top $B^2$ formed slanting backward, upward, and then downward, as shown in Fig. 1.

$D'\,D^2$ are two inwardly-converging guards or side cutters attached to the forward ends of the frame $A'$, at each end of the cutting-wheel, to cut the snow at the sides and guide it inward to the cutting-wheel.

$E'$ is an inclined frame, having an inclined shaft, $g'$, mounted in it at right angles to it, and adapted to be revolved by bevel-gears $g^2$ $g^3$, and a shaft, $g^4$, journaled across the frame $A'$, and driven by a chain, $g^5$, from the shaft $C^2$, as shown. Upon top of this frame $E'$ is a circular trough, $h'$, in which a series of balls, $h^2$, rest, the center of the trough $h'$ being also the center of the shaft $g'$. Lying upon top of this frame $E'$ is another similar frame, $E^2$, pivoted upon the shaft $g'$, and adapted to revolve upon the balls $h^2$, the balls thus acting as anti-friction rollers.

Upon the upper end of the shaft $g'$, above the frame $E^2$, is a bevel-gear, $g^6$, adapted to engage with a bevel-pinion, $g^7$, on a shaft, $C^3$, running across the frame $E^2$, and journaled by its ends in suitable bearings upon said frame $E^2$. Pivoted upon the outer ends of this cross-shaft $C^3$ is a frame consisting of parallel angular sides $F'\,F^2$, across which shafts $i$ are journaled at regular intervals. This frame $F'\,F^2$ is cut away at $m$, as shown at Fig. 1, to enable it to be tilted up and down a short distance to raise and lower its outer end, as indicated by dotted lines $F^3$ in Fig. 1. By this means the frame $F'\,F^2$ may be lowered down, when not in use, so that it will not project higher than an ordinary car, or raised up, when in use, to convey the snow above the drifts, as hereinafter shown.

Upon one or both of the ends of each of the shafts $i$ cranks $i^2$ are secured, and all the cranks upon each side connected together by rods $i^3$, so that the revolution of one shaft will be communicated to all the others.

Upon one of the shafts $i$ a chain-pulley, $i^4$, is placed and connected by a chain, $i^5$, to a chain-pulley, $g^5$, on the shaft $C^3$, so that the revolution of the shaft $C^2$ will communicate motion to the shaft $C'$ and series of shafts $i$, and by pivoting the frame $E^2$ upon the driving-shaft $g'$, and pivoting the frame $F' F^2$ upon the shaft $C^3$, the frame may be revolved and the frame $F' F^2$ tilted while the machinery is in motion without affecting it. Each of the shafts $i$ is provided with a drum, $i^6$, to which are attached radiating buckets or blades $i^7$, while convex troughs $i^8$ (shown only at the right of Fig. 1) will be placed beneath each of the drums and shafts.

When the track-clearer is to be used, it is run up to the edge of the drift and the frame $F' F^2$ turned upon the frame $E'$ until the frame is at right angles to the frame $A'$, as shown in Fig. 6. The machinery is then set in motion and the clearer forced forward by a locomotive or other power. The cutting-wheel will cut the snow out and carry it up and throw it over upon the revolving drums $i^6$ and blades $i^7$, which will throw it from one to the other and convey it off and discharge it over the end at N, at some distance from the track. If the drift is a low one, the frame $F' F^2$ need not be tilted up at its outer end, N; but if the drift is higher, the frame may be tilted up to pass over it.

A shield, P, will be attached to the side of the frame $F' F^2$ when turned off to one side, as shown in Figs. 6 and 9, to prevent the snow from clogging the cranks $i^2$ and other parts. This shield P, by being formed angular, will catch any snow that may project above the bottom of the frame $F' F^2$ and chute it up and over upon the conveyer, and thus serve as a scraper or plow to cut off the drift at the side of the track. When the frame $F' F^2$ is turned off to one side, the snow thrown over by the cutting-wheel would be inclined to fly back beyond the frames; but to prevent this I arrange a board, R', (see Figs. 6, 7, and 8,) upon the frame $F' F^2$ to act as a stop to the snow and guide it down upon the conveyer. This stop-board has a lip-plate, $R^2$, projecting down over the frame $F' F^2$, to prevent the snow getting in behind the frame, and causes all of it to fall upon the conveyers.

Having described my invention and set forth its merits, what I claim is—

1. The combination of a frame mounted upon trucks adapted to run upon a railroad-track, a plow attached to said frame in advance of said trucks, a revolving cutting-wheel in advance of said plow, and a swinging frame carrying a series of revolving conveyer-drums, substantially as and for the purpose set forth.

2. The combination of frame $A'$, mounted upon trucks adapted to run upon a railroad-track, a plow, $B'$, attached to said frame in advance of said trucks, side cutters attached to the forward ends of said frame, a revolving cutting-wheel upon said frame in advance of said plow, and a frame swiveled upon said frame $A'$ and carrying a series of revolving conveyer-drums, $i^6 i^7$, and troughs $i^8$, substantially as described.

3. The frame $A'$, having the inclined frame $E'$, ring $h'$, carrying balls $h^2$, inclined frame $E^2$, pivoted centrally upon said frame $E'$ and carrying tilting frame $F' F^2$, shafts $i$, journaled in said frame $F' F^2$ and carrying buckets $i^7$, and means for revolving said shafts $i$ and their attached buckets $i^7$, whereby said frame $E^2$ may be revolved upon said frame $E'$ and said frame $F' F^2$ tilted upon said frame $E^2$ without affecting the revolution of said shafts $i$, substantially as and for the purpose specified.

4. The combination of the frame $A'$, carrying the cross-shaft $g^4$ and inclined frame $E'$, shaft $g'$, journaled in said frame $E'$ at right angles thereto, frame $E^2$, pivoted centrally upon said frame $E'$ and having shaft $C^3$ journaled thereon at right angles to shaft $g'$, means for transmitting motion from shaft $g^4$ through shaft $g'$ to shaft $C^3$, frame $F^2$, pivoted upon said shaft $C^3$ and carrying a series of revolving conveyer-drums, and means for transmitting the motion of shaft to said conveyer-drums, substantially as shown and described.

5. The combination of a frame mounted upon trucks adapted to run upon a railroad-track, a plow attached to said frame in advance of said trucks, a revolving cutting-wheel in advance of said plow, a swinging frame carrying a series of revolving conveyer-drums and snow-guard $R' R^2$, and combined scraper and guard P, substantially as and for the purpose described.

WARREN DUNBAR.

Witnesses:
C. D. SYMMES,
EDMUND SMITH.